(12) United States Patent
Buzzetti

(10) Patent No.: US 6,428,391 B2
(45) Date of Patent: Aug. 6, 2002

(54) METHOD AND APPARATUS FOR POLISHING

(76) Inventor: Mike Buzzetti, 4401 "D" El Camino Real, Atascadero, CA (US) 93422

(*) Notice: Subject to any disclaimer, the term of this patent is extended or adjusted under 35 U.S.C. 154(b) by 0 days.

(21) Appl. No.: 09/855,952

(22) Filed: May 14, 2001

Related U.S. Application Data

(60) Division of application No. 09/177,794, filed on Oct. 22, 1998, now Pat. No. 6,302,763, which is a continuation-in-part of application No. 09/106,328, filed on Jun. 29, 1998, now abandoned.

(51) Int. Cl.⁷ .................................................. B24B 7/00
(52) U.S. Cl. ...................... 451/11; 451/41; 451/164; 451/166
(58) Field of Search ................................ 451/9, 10, 11, 451/41, 164, 166, 170, 271, 273, 278

(56) References Cited

U.S. PATENT DOCUMENTS

| | | |
|---|---|---|
| 3,435,562 A | 4/1969 | Maillet |
| 3,769,762 A | 11/1973 | Mayo |
| 4,693,035 A | 9/1987 | Doyle |
| 4,831,784 A | 5/1989 | Takahashi |
| 4,850,152 A | 7/1989 | Heynacher et al. |
| 4,891,916 A | 1/1990 | Rhoades et al. |
| 4,979,334 A | 12/1990 | Takahashi |
| 5,007,209 A | 4/1991 | Saito et al. |
| 5,048,929 A | 9/1991 | Watanabe et al. |
| 5,107,627 A | 4/1992 | Mock, Jr. et al. |
| 5,184,433 A | 2/1993 | Maack |
| 5,201,148 A | 4/1993 | Rupert et al. |
| 5,216,846 A | 6/1993 | Takahashi |
| 5,349,784 A | 9/1994 | Grois et al. |
| 5,454,747 A | 10/1995 | Ascalon |
| 5,458,531 A | 10/1995 | Matsuoka et al. |
| 5,480,344 A | 1/1996 | Xu et al. |
| 5,497,443 A | 3/1996 | Jie et al. |
| 5,516,328 A | 5/1996 | Kawada |
| 5,558,564 A | 9/1996 | Ascalon |
| 5,559,916 A | 9/1996 | Terao et al. |
| 5,674,114 A | 10/1997 | Miller et al. |
| 5,743,787 A | 4/1998 | Ishiyama et al. |
| 5,895,311 A | 4/1999 | Shiotani et al. |

*Primary Examiner*—Eileen P. Morgan
(74) *Attorney, Agent, or Firm*—Fitzpatrick, Cella, Harper & Scinto

(57) ABSTRACT

A method and machine for polishing, especially adapted for polishing fiber optic connectors and similarly configured industrial components. The polishing machine includes a first stage having a first mounting member and a first staging member supported on the first mounting member for reciprocal movement along a first path; a second stage having a second mounting member supported on the first staging member and a second staging member supported on the second mounting member for reciprocal movement along a second path in angular relation to the first path; a polishing member mounted on the second staging member; and a drive mechanism operable to simultaneously reciprocate the first and second staging member along their respective paths so that the polishing member traces a predetermined pattern. The method of polishing involves reciprocating the first stage along its path, and reciprocating the second stage along its path in a predetermined timed relationship so that the polishing member traces the predetermined pattern. The subject invention enables the polishing member to be moved along a uniform and constant figure eight polishing pattern, which pattern is mechanically created and maintained during the polishing action. The method and apparatus are suited for simultaneously polishing a large number of fiber optic connectors or similar items.

17 Claims, 4 Drawing Sheets

METHOD AND APPARATUS FOR POLISHING

CROSS REFERENCE TO RELATED APPLICATION

This application is a division of my application No. 09/177,794, filed Oct. 22, 1998 now U.S. Pat. No. 6,302,763, entitled Method and Apparatus for Polishing, that in turn is a continuation-in-part of my prior application No. 09/106,328, filed Jun. 29, 1998 now abandoned and entitled Process for Creating, by Mechanical Means, a Controlled Figure 8 Polishing Pattern for Use in the Manufacture and Operation of A Fiber Optic Connector Polishing Machine Capable of Simultaneously Polishing 12 to 36 Connectors each of said earlier applications being incorporated in its entirety by reference herein.

FIELD OF THE INVENTION

The present invention pertains to a method and apparatus for polishing and more particularly to method and apparatus for controlling the movement of a polishing member along a predetermined path.

BACKGROUND

Fiber optic connectors are required in large quantities in the telecommunications and cable television markets for the manufacture and use of fiber optic assemblies and components. In order to enable the connectors to provide the most optimum transmission path for the fiber optic cables, the ends of the connectors require special polishing. Current machines for polishing fiber optic connector polishers polish only in a circular pattern which does not produce the most effective polish. Moreover, the current polishers can polish no more than eighteen connectors at one time.

The art of polishing fiber optic connectors has been derived from the art of polishing gem stones. Basically, a gem stone polishing machine includes a rotating platter against which the gemstone is moved to effect polishing. This gemstone polishing technique was initially adopted for polishing fiber optic connectors and then subsequently modified.

The polishing surface in such gemstone polishing machines thus travels in a circular pattern, and the gemstone polishers modified to polish fiber optic connectors have likewise employed a circular pattern.

It is known, however, that a more effective polish can be obtained if the polishing surface travels in a figure eight pattern, rather than a circular pattern, as the polishing surface moves over the connector. The figure eight pattern, if it can be obtained and maintained during the polishing operation, provides the optimum method of polishing the end faces of fiber optic connectors. A constant figure eight pattern produces the best radii and apex shift obtainable on the spherical ends of the connectors and on similarly configured industrial components.

Not only is a circular pattern less effective in creating the desired polish on the connectors, it limits the number of connectors that can be polished at the same time. As shown in Kawada U.S. Pat. No. 5,516,328, such a polisher rotates and revolves and thereby traces circular polishing paths that are revolved about a center. As a result the connectors must be located at the periphery in a circular formation with no connectors in the center, whereby fewer connectors can be polished than if the formation included connectors in the center.

SUMMARY

A method and machine for polishing, especially adapted for polishing fiber optic connectors and similarly configured industrial components, is provided. The polishing machine includes a first stage having a first mounting member and a first staging member supported on the first mounting member for reciprocal movement along a first path; a second stage having a second mounting member supported on the first staging member and a second staging member supported on the second mounting member for reciprocal movement along a second path in angular relation to the first path; a polishing member mounted on the second staging member; and a drive mechanism operable to simultaneously reciprocate the first and second staging members along their respective paths so that the polishing member traces a predetermined pattern. The method of polishing involves reciprocating the first stage along its path, and reciprocating the second stage along its path in a predetermined timed relationship so that the polishing member traces the predetermined pattern. The subject invention enables the polishing member to be moved along a constant and uniform figure eight polishing pattern, which pattern is mechanically created and maintained during the polishing action. The method and apparatus are suited for simultaneously polishing a large number of fiber optic connectors or similar items.

An object of this invention is to provide an optimum polishing pattern for polishing fiber optic connectors, or similar items.

Another object is to create and maintain a uniformly constant figure eight polishing pattern especially suited for polishing fiber optic connectors or similar items.

A further object is to provide a polishing machine that creates a figure eight polishing pattern mechanically.

An additional object is to be able to polish a large number of fiber optic connectors, or similar items, simultaneously.

Yet another object is to produce optimum quality polishing of fiber optic connectors or similar items.

Still another object is to incorporate a figure eight polishing pattern into a compact polishing machine.

A further object is to be able to produce higher quality polished fiber optic connectors, or similar products, more rapidly, in greater quantities, and with lower unit costs than is now obtainable with the prior known polishing techniques.

A still further object is to provide a polishing machine that is easy to operate, requires minimum maintenance, and has a very long life expectancy.

These and other objects will become apparent upon reference to the following description and claims and to the accompanying drawings.

DETAILED DESCRIPTION

Figure 1:
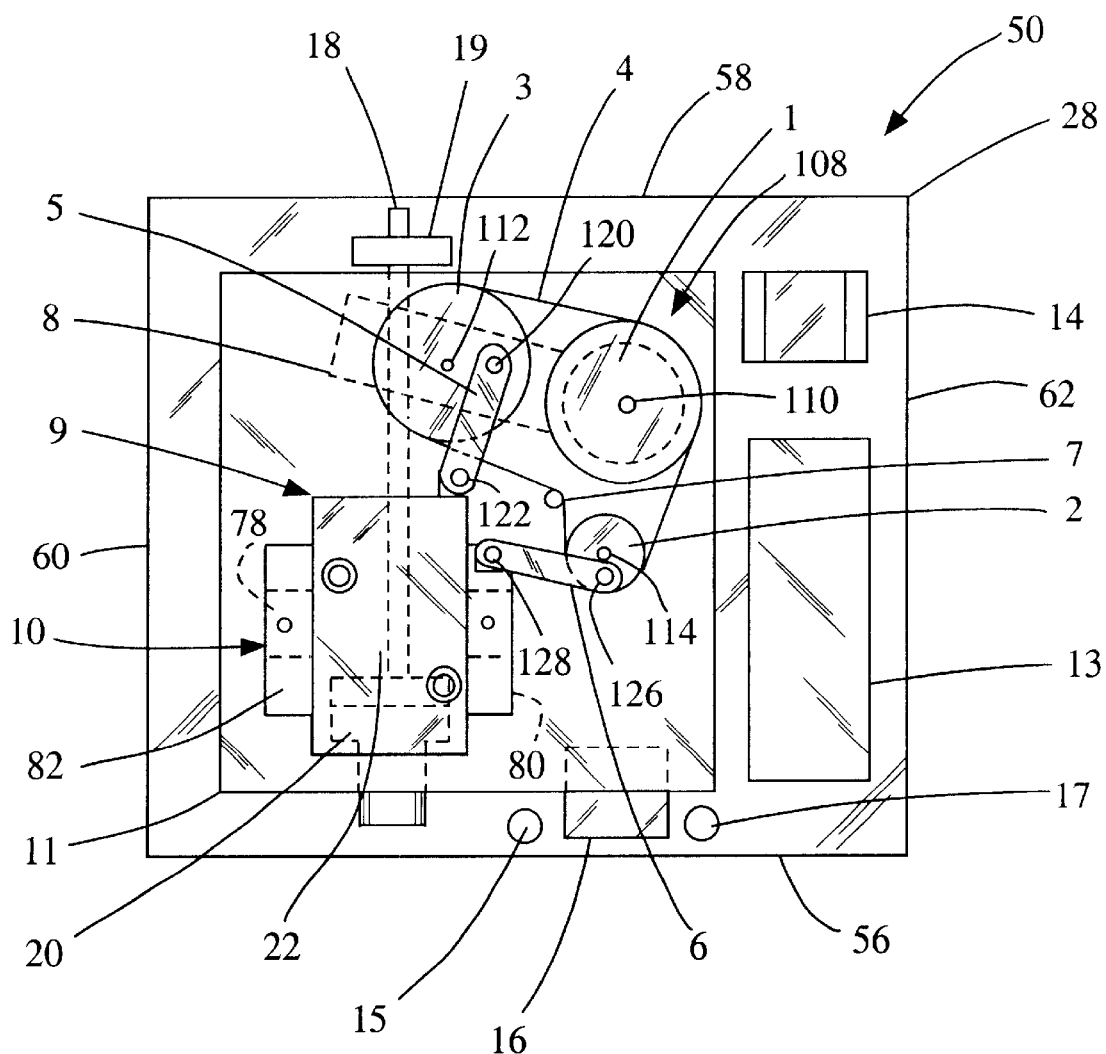
FIG. 1 is a top plan view of the subject polishing machine with the casing of the machine opened to show the components inside of the casing.
Figure 2:
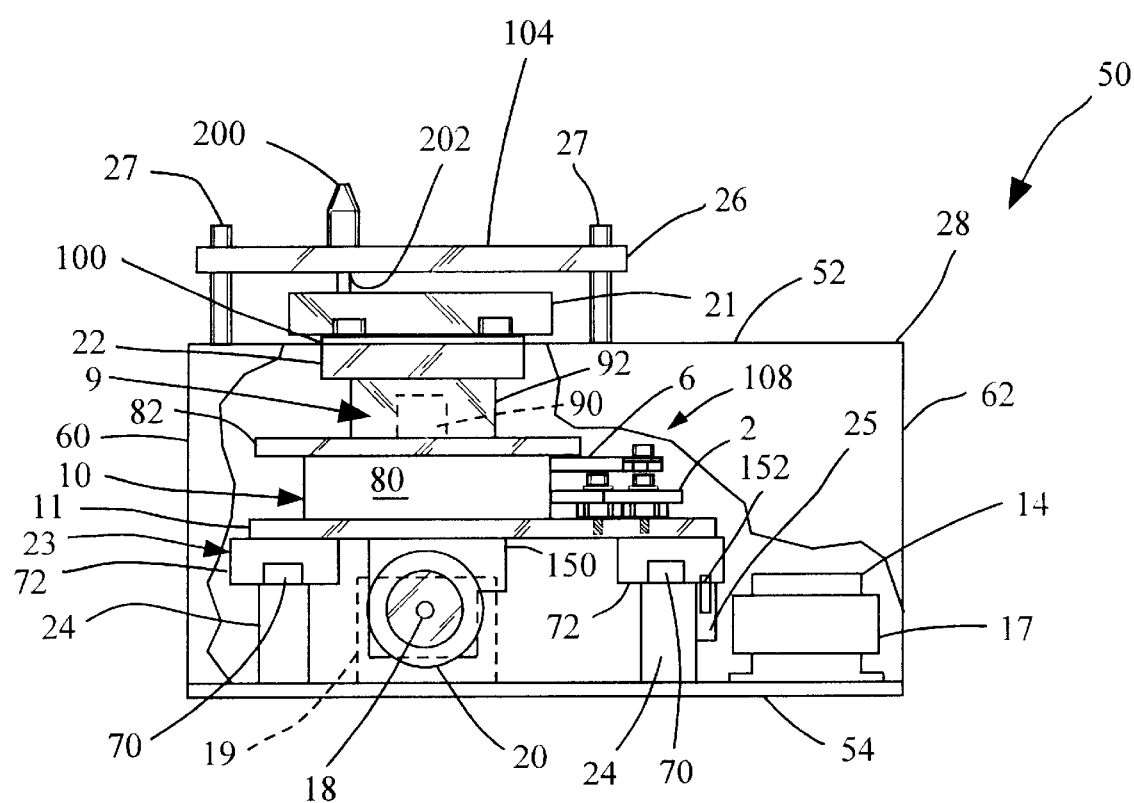
FIG. 2 is an enlarged front elevation of the machine showing FIG. 1 but with the front wall of the casing removed so as to show the components inside of the casing.

A polishing machine constructed in accordance with the principles of the present invention is generally indicated by the reference numeral 50 in FIGS. 1 and 2. The polishing machine includes a generally rectangular casing or housing 28 having a flat top wall 52, a flat bottom wall 54, a front wall 56, a back wall 58, and left and right side walls 60 and 62 respectively. With particular reference to FIG. 2, a pair of elongated, transversely spaced mounting blocks 24 are secured to the bottom wall of the casing and extend generally from adjacent to the front wall to adjacent to the back wall in substantially parallel relationship to the side walls.

An x-2 stage 23 includes a pair of elongated, x-2 stage tracks 70 secured to the mounting blocks 24 and extending substantially the full length thereof. Accordingly, these stage tracks define an x-2 axis or path generally parallel to the side walls 60 and 62. The x-2 stage also includes an inverted U-shaped x-2 stage bodies 72 individually slidably mounted on the stage tracks for movement along the x-2 axis. The x-2 stage also includes a substantially flat x-2 stage plate 11 bridging and securing to the stage bodies and in a horizontal position when the bottom wall of the casing is horizontal. The x-2 stage plate is rectangular and flat and occupies a large area with the casing although being of slightly smaller outside dimensions than the casing, as best seen in FIG. 1. Moreover, the x-2 stage plate is disposed slightly to the left of the casing, as seen in FIG. 1, thereby leaving space between the stage plate and the right side wall 62. Accordingly, the x-2 stage plate and the stage bodies have freedom to move forwardly and rearwardly within the casing on the stage tracks. The length of the stroke of movement of the stage plate is relatively minimal and in the preferred embodiment is approximately from ¾ inch to 1 inch of travel.

The subject polishing 50 (FIGS. 1 and 2) also includes a y-stage 10 having a single elongated y-stage track 78 that is mounted on and secured to the x-2 stage plate 11 in generally the front left corner of the x-2 plate, as best shown in FIG. 1. The y-stage track is in right angular relation to the x-2 axis and thus defines a y-axis or path perpendicular to the x-2 axis and parallel to the front and rear walls 56 and 58 of the casing 28. An inverted, U-shaped y-stage body 80 is slidably mounted on the y-stage track, and a y-stage plate 82 is secured to the y-stage body in generally parallel relation to the x-2 stage plate 11. The y-stage plate is also flat and rectangular but is much smaller in outside dimensions than the x-2 stage plate, as best seen in FIG. 1. Thus, the y-stage plate and the y-stage body are reciprocally moveable on the y-stage track along the y-axis and have a predetermined stroke to which reference will subsequently be made.

Still further, the polishing machine 50 (FIGS. 1 and 2) includes an x-1 stage 9 having an x-1 stage track 90 secured to the y-stage plate 82 in right angular relation to the y-stage track and thus defining an x-1 axis perpendicular to the y-axis and parallel to the side walls 60 and 62 and x-2 axis. The x-1 stage also includes an inverted U-shaped x-1 stage body slidably mounted on the stage track for reciprocal movement along the x-1 axis. An x-1 stage plate or interface plate 22 is secured to the x-1 stage body in generally parallel relation to the y-stage plate 82 and the x-2 stage plate 11, as best seen in FIG. 2. Moreover, as best seen in FIG. 1, the x-1 stage plate is of a shape similar to the y-stage plate 82 and is generally perpendicular to it. Thus, the x-1 stage plate is mounted for movement with the x-1 stage body along the x-1 axis defined by the x-1 stage track.

The generally square base plate 21 (FIGS. 1 and 2) is disposed above the top wall 52 of the casing 28 in parallel relation thereto and is secured to the x-1 stage plate 22 through an opening 100 in the top wall of the casing. The base plate has a flat, top polishing surface 104 to which a polishing media, such as a film or a slurry, is applied for effecting the polishing action. These polishing media and their application are well known in the art and are thus not described in any detail herein.

With particular reference to FIG. 1, a main drive pulley 1 is located generally in the upper right hand corner of the x-2 stage plate 11 and has a drive shaft 110 rotatably mounted on the x-2 stage plate. An x-1 drive pulley 3 has its drive shaft 112 also rotatably mounted on x-2 stage plate in laterally offset relationship to the main drive pulley. A y-drive pulley 2 has its drive shaft 114 also rotatably mounted on the x-2 stage plate in forwardly spaced relation to the main drive pulley. Furthermore, an idler pulley 7 is interposed the x-1 and y-drive pulleys, a timing belt 4 connects all of the pulleys, and a main drive motor 8 is connected to the main drive shaft 110 for imparting rotation to the pulleys. It is thus to be observed that all of these pulleys are in a common plane parallel to the x-2 stage plate 11, that the diameters of the main and x-1 drive pulleys are the same, and that the diameter of the y-drive pulley is less than the diameter of the x-1 drive pulley. Accordingly, the speed of rotation of the y-pulley is greater than the speed of rotation of the x-1 pulley. An x-1 connecting rod 5 is connected by pin 120 to the x-1 drive pulley and by pin 122 to the rearward end of the x-1 stage plate 22. A y-connecting rod 6 is connected by a pin 126 to the y-drive pulley 2 and by a pin 128 to the right end of the y-stage plate 82.

Figure 4:
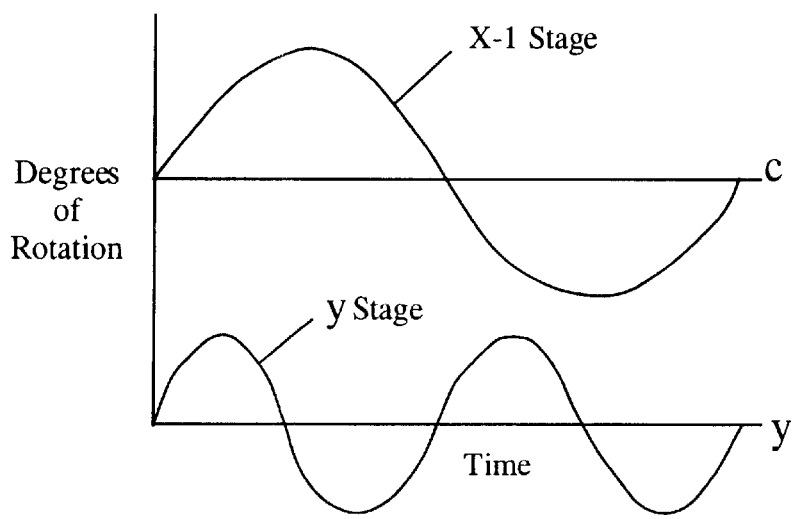
FIG. 4 are timing diagrams of the two stages of the subject polishing machine and method.
Figure 5:
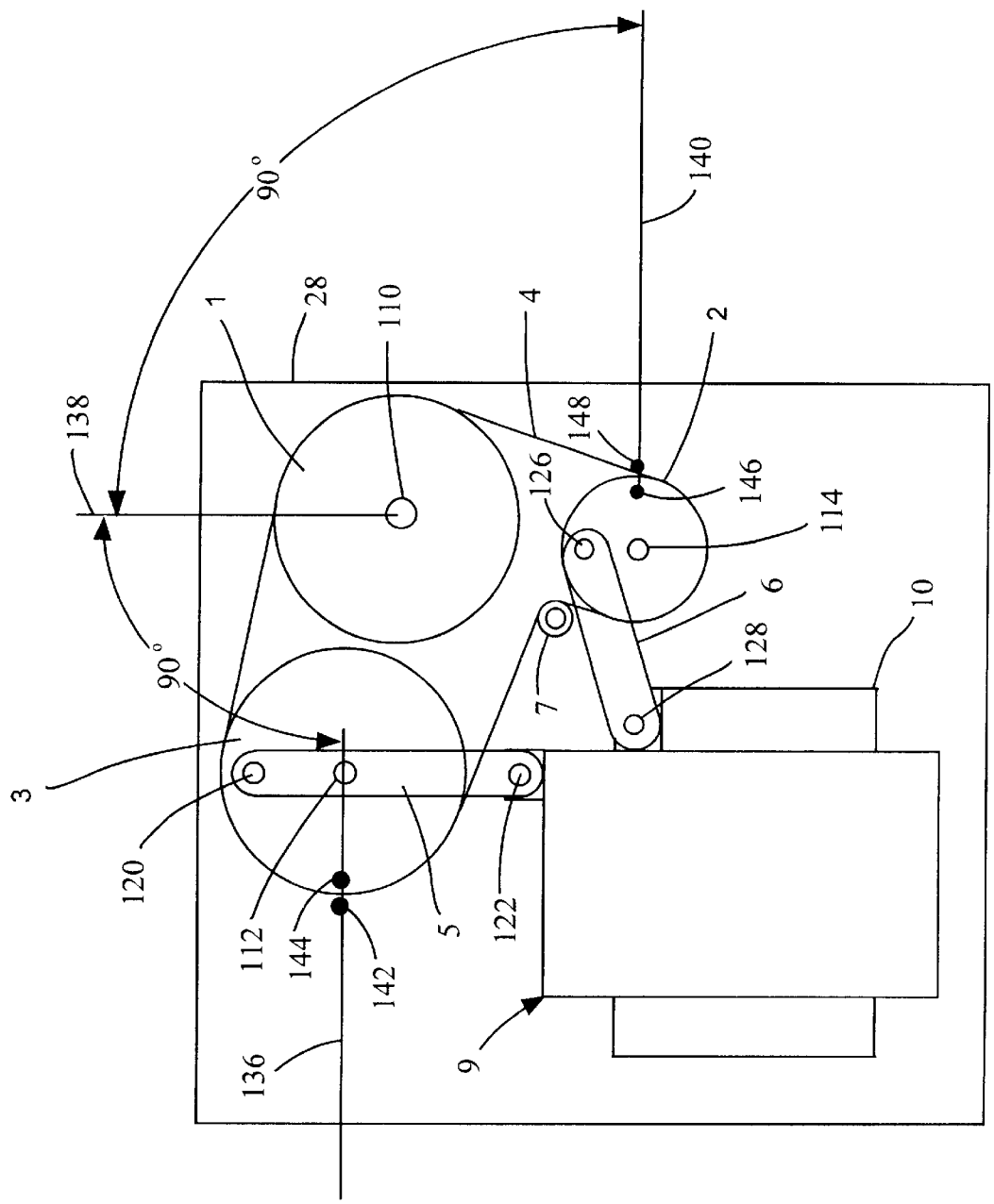
FIG. 5 is a view similar to FIG. 1 but showing angular relationships among the parts of the drive mechanism of the subject machine.

With reference to FIGS. 4 and 5, certain relationships of the drive mechanism 108 are now described. With the drive pulleys 1, 2 and 3 and the connecting rods 5 and 6 in the positions shown in FIG. 5, the connecting rod 5 is aligned with the x-1 axis and extends diametrically of the x-1 drive pulley. At this same time in the cycle of movement of the drive mechanism, the connecting pin 126 for the y-connecting rod 6 is at its rearwardmost position. In adjusting the positions of the pulleys during installation thereof, the described relationship of the x-1 and y-connecting rods 5 and 6 to their respective pulleys 3 and 2 is accomplished by insuring the ninety degree relationships shown in FIG. 5. That is, in this setting position for the timing of the drive mechanism, there is a ninety degree angle between the x-reference line 136 and the main reference line 138 and a ninety degree angle between the main reference line 138 and the y-reference line 140. Such adjustments insures proper timed movements of the x-1 and y-stage plates 22 and 82, respectively. Alignment of the x-1 timing dots 142 and 144 respectively on the x-2 stage plate 11 and the x-1 drive pulley 3 and alignment of the y-timing dots 146, 148 respectively on the x-2 stage plate 11 and the y-drive pulley 2 insure proper setting of the correct timing relationships In the preferred embodiment (FIGS. 1, 2, and 5) of the subject machine 50, the main and x-1 drive pulleys 1 and 3 each has a radius of 1.50 inches and the y-drive pulley 2 has a radius of 0.75 inches, whereby the diameter of the x-1 drive pulley is two times the diameter of the y-drive pulley. Although the exact dimensions of the pulleys are not critical in the present invention, the 2:1 ratio of the diameters of the x-1 drive pulley to the y-1 drive pulley is critical to achieving a constant and uniform figure eight pattern. Because of this 2:1 ratio, it will be understood that the stroke of the x-1 stage is 2 times the stroke of the y-stage. Furthermore, the distance between the y-reference line 140 and the center of the main drive shaft 110 is 2.4375 inches whereas the distance between the main reference line 138 and the center of the x-1 drive shaft 112 is 2.8438 inches. The important point to note here is that although these specific dimensions are not critical and may be varied, the dimensional relationships are important and do control the figure-eight pattern traced by the polishing surface 104.

With reference to FIGS. 1 and 2, a bracket 150 is secured to and depends from the x-2 stage plate 11 adjacent to the front wall 56 of the casing 28. A lead screw 18 is rotatably received in the bracket and extends fore and aft of the casing in parallel relationship between the mounting blocks 24. A lead nut 19 is secured to the casing adjacent to the rear wall 58 and threadably receives the lead screw. An x-2 drive motor 20 is connected to the lead screw so that upon rotation of the lead screw, the x-2 stage plate 11 is moved forwardly and rearwardly within the casing along the x-2 axis depending on the direction of rotation of the screw. Forward and rearward limits switches 25 are mounted on one of the mounting blocks 24 for engagement by a striker 152 that depends from one of the x-2 stage bodies 72, as illustrated in FIG. 2. Thus, as the lead screw 18 rotates clockwise in FIG. 2, the x-2 stage plate moves forwardly until the striker 152 engages the forward limit switch. Closure of the forward limit switch reverses the motor which causes the lead screw to rotate in a counterclockwise direction and move the x-2 stage plate rearwardly. Upon the striker engaging the rearward limit switch, the motor again reverses and the cycle repeats. Engagement of the striker with the limit switches thus causes reciprocal movement of the x-2 stage plate, and thus both of the y- and x-2 stages, along the x-2 axis.

In addition, the subject polishing machine 50 (FIGS. 1 and 2) includes a power supply 13, start and stop switches 17 and 15, and a timer 16. The power supply supplies power to the drive motors 8 and 20 and to the timer. The start and stop switches energize and de-energize the two motors. The timer is in the circuit with the two drive motors so as to control the amount of polishing time.

Although not part of the subject polishing machine 50, a polishing fixture 26 is illustrated in FIG. 2. This fixture is mounted on the top wall 52 of the casing 28 and straddles the base plate 21, being positioned by locating pins 27. The polishing fixture is capable of mounting a rectangular array of fiber optic connectors 200, only one of which is shown in FIG. 2. Each of these connectors is vertically disposed so as to have its end 202 to-be-polished in engagement with the polishing surface 104 of the base plate 21. Thus, when the polishing fixture is loaded with fiber optic connectors, there are rows and columns of connectors extending parallel to the x and y axis described above with the surfaces to-be-polished 202 all in engagement with the base plate 21. In a preferred embodiment of the polishing fixture, the connectors may be located on one inch centers thereby providing for the holding of large arrays of connectors in polishing positions. Preferred embodiments of the polishing fixture respectively mount 12, 24, 36, and 48 connectors in such a rectangular array, it being understood that even more connectors may be accommodated using the figure eight polishing pattern of the present invention.

OPERATION

Figure 3:
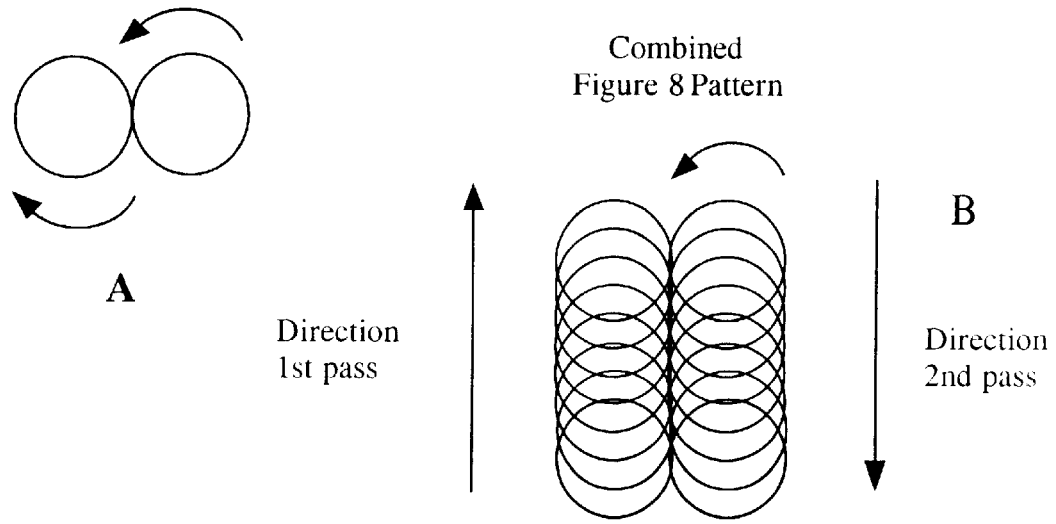
FIG. 3A is a view of the figure eight pattern created by the subject machine and method.
FIG. 3B is a schematic diagram showing the multiplicity of figure eight patterns similar to those created during operation of the subject machine and method.

With reference to FIG. 3, operation of the subject polishing machine 50 moves the base plate 21 in a perfect figure eight pattern close to but not exactly the same as shown in FIG. 3B. As is known and in general, the parts of a figure eight may be occur in slightly varying shapes and still be recognizable as a figure eight, and such is the case with the figure eight pattern created by the subject machine. In operation, the main drive motor 8 is energized to rotate the x-1 drive pulley 3 and the y-drive pulley 2 each of which, through their respective connecting rods 5 and 6, reciprocates the x-1 stage plate 22 and the y-stage plate 82. The cycles of movement of the x-1 and y-stages are illustrated in FIG. 4 which shows timing diagrams for the two stages on a common time line. As previously stated, the stroke of the x-1 stage plate is twice the stroke of the y-stage plate. Although each stage plate moves reciprocally along its individual axis, the resultant movement of the base plate is in a figure eight pattern. Furthermore, with energization of the x-2 drive motor 20, the x-2 stage plate 11 and thus both of the y-stage 10 and the x-1 stage 9 are moved forwardly and rearwardly along the x-2 axis so that the figure eight pattern is moved forwardly and rearwardly, similar to that illustrated in FIG. 3B. That is, although each individual figure eight pattern differs slightly from those shown in FIG. 3A and 3B, the overall pattern of moving figure eights, whereby a succession of multiple figure eights (eight as shown in FIG. 3B) is created, is generally as shown in FIG. 3B.

From the foregoing it will be understood that the polishing machine 50 allows use of all of the area of the polishing surface 104 to polish the connectors 200, or similarly configured industrial components. By using a figure eight polishing pattern that is uniform and constant, a full rectangular array of connectors 200 can be provided thereby allowing far more connectors to be polished simultaneously than previous polishing machines. In previous machines, such a large number of connectors to-be-polished can not be accommodated since the connectors can be positioned only at the outer most edges or periphery of the rotating polishing surface that traces a circular pattern.

The subject machine 50 produces not only a uniform and constant figure eight polishing pattern (FIG. 3A), but it also moves the pattern back and forth to produce multiple figure eight patterns (FIG. 3B) and thereby prevent wear and burnout of the lapping film on the polishing surface 104 and allow for maximum usage of various polishing media, whether films or slurries. The subject polishing pattern is created by the described and illustrated mechanical motion control system employing the components shown and described.

Although preferred embodiments of the present invention have been shown and described, various modification and substitutions may be made thereto without departing from the spirit and scope of the present invention. Accordingly, it is to be understood that the present invention has been described by way of illustration and not limitation.

What is claimed is:

1. A polishing machine, comprising:

a first stage including a first mounting member and a first staging member supported on the first mounting member for reciprocal movement along a first path, a second stage including a second mounting member supported on the first staging member and a second staging member supported on the second mounting member for reciprocal movement along a second path in angular relation to the first path, a polishing member mounted on the second staging member, and a drive mechanism including linkages and pulleys operable to simultaneously reciprocate the first and second staging members along their respective paths so that the polishing member traces a predetermined pattern.

2. The polishing machine of claim 1, wherein the paths of movement of the first and second staging members are rectilinear.

3. The polishing machine of claim 1, wherein the first path is an x-axis, wherein the second path is a y-axis substantially perpendicular to the x-axis.

4. The polishing machine of claim 3, wherein the speed of movement of the one staging member is a multiple of the speed of movement of the other staging member.

5. The polishing machine of claim 4, wherein the multiple is 2.

6. The polishing machine of claim 1, wherein the pattern is a figure eight.

7. The polishing machine of claim 1, wherein the first mounting member is mounted for reciprocal movement along a third path.

8. A polishing machine, comprising:

a support, a first stage including a first track mounted on the support and a first staging member supported on the track for reciprocal rectilinear movement along an x-axis, a second stage including a second track mounted on the first staging member and a second staging member mounted on the second track for reciprocal rectilinear movement along a y-axis perpendicular to the x-axis, a polishing member mounted on the second staging member, and a drive mechanism including linkages connected to the first and second staging members and belt-driven pulleys connected to the linkages for reciprocating the staging members along their respective axes so that the polishing member traces a closed arcuate path.

9. The polishing machine of claim 8, wherein the stroke of one of the members is a multiple of the stroke of the second member.

10. The polishing machine of claim 9, wherein the multiple is 2.

11. The polishing machine of claim 8, wherein the path is a figure eight.

12. The polishing machine of claim 8, wherein the first track is mounted on the support for reciprocal movement along a third axis substantially parallel to one of the x- and y-axes.

13. A method of polishing a workpiece with a polishing member that is mounted on one of a pair of stage members that are interconnected for rectilinear movement relative to each other, comprising:

applying force to a first of the stage members, through the use of a first pulley and first linkages, to cause the first stage member to reciprocate along a first path, applying force to the other stage member, through the use of a second pulley and second linkages, to cause the second stage member to reciprocate along a second path that is angularly related to the first path and at a speed of movement that is a multiple of the speed of movement of the first stage member whereby the polishing member is caused to trace a predetermined pattern.

14. The method of claim 13, wherein the multiple is greater than 1.

15. The method of claim 13, wherein the paths are at right angles to each other.

16. A method of polishing a fiber optic connector with a polishing member that is mounted on an x-stage that in turn is mounted on a y-stage, the stages being interconnected for rectilinear movement relative to each other, comprising:

reciprocating the x-stage with a pulley and linkages connected to the x stage along an x-axis having a predetermined length, and reciprocating the y-stage with another pulley and other linkages connected to the y stage along a y-axis that is perpendicular to the x-axis and less than the length thereof and at a speed of movement that is greater than the speed of movement of the y-stage whereby the polishing member polishes the connector in a figure eight pattern.

17. The method of claim 16, wherein the both of the stages are reciprocated along a second x-axis parallel to the first mentioned x-axis whereby the figure eight pattern of the polisher is moved back and forth over the connector.

* * * * *